United States Patent
Karl et al.

(10) Patent No.: US 11,502,637 B2
(45) Date of Patent: Nov. 15, 2022

(54) DETERMINATION OF THE ROTOR TEMPERATURE OF A PERMANENT MAGNET SYNCHRONOUS MACHINE

(71) Applicant: AUDI AG, Ingolstadt (DE)

(72) Inventors: Bernhard Karl, Gaimersheim (DE); Martin Adam, Ingolstadt (DE); Sebastian Heber, Beilngries OT Grampersdorf (DE); Franz Honkomp, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 17/037,367

(22) Filed: Sep. 29, 2020

(65) Prior Publication Data
US 2021/0099124 A1    Apr. 1, 2021

(30) Foreign Application Priority Data

Sep. 30, 2019   (DE) .......................... 102019126268.2

(51) Int. Cl.
*H02P 29/66*    (2016.01)
(52) U.S. Cl.
CPC ................... *H02P 29/662* (2016.11)
(58) Field of Classification Search
CPC ..................................................... H02P 29/662
See application file for complete search history.

(56) References Cited

U.S. PATENT DOCUMENTS

| | | | |
|---|---|---|---|
| 2009/0174351 A1* | 7/2009 | Eisenhardt | G01K 7/42 318/400.21 |
| 2013/0106329 A1* | 5/2013 | Kato | H02P 21/26 318/400.11 |
| 2013/0214714 A1* | 8/2013 | Eisenhardt | H02P 29/67 318/400.21 |
| 2014/0217935 A1* | 8/2014 | Matsui | B60L 58/18 318/139 |
| 2014/0232307 A1* | 8/2014 | Yokozutsumi | H02P 6/28 318/400.02 |
| 2014/0333240 A1* | 11/2014 | Kobayashi | H02P 29/662 318/400.02 |
| 2015/0357954 A1* | 12/2015 | Kim | H02P 21/141 318/400.02 |
| 2016/0141999 A1* | 5/2016 | Han | H02P 21/00 318/473 |

FOREIGN PATENT DOCUMENTS

| | | |
|---|---|---|
| DE | 197 47 410 | 4/1999 |
| DE | 10 2008 042 978 | 4/2010 |
| DE | 10 2012 209 057 | 12/2012 |
| DE | 10 2012 221 757 | 9/2013 |
| DE | 10 2014 216 312 | 2/2016 |
| JP | 2001-186800 A | 7/2001 |

* cited by examiner

*Primary Examiner* — Zoheb S Imtiaz
(74) *Attorney, Agent, or Firm* — Seed IP Law Group LLP

(57) ABSTRACT

Methods and apparatuses for determining a rotor temperature of a permanent magnet synchronous machine (PSM) of an electrically driven vehicle are described.

5 Claims, 1 Drawing Sheet

DETERMINATION OF THE ROTOR TEMPERATURE OF A PERMANENT MAGNET SYNCHRONOUS MACHINE

BACKGROUND

Technical Field

Embodiments of the present invention relate to a method and an apparatus for determining rotor temperature of a permanent magnet synchronous machine (PSM) of an electrically-driven vehicle.

Description of the Related Art

Rotor temperature of a permanent magnet synchronous machine cannot be determined directly using existing technologies, since no temperature sensor can be installed in the rotor. However, the rotor temperature is crucial for component protection of the electrical machine.

In existing technologies, rotor temperature is deduced by a temperature model stored in a converter on the basis of a load profile and of measured data from sensors located nearby. The model can only estimate the rotor temperature; an exact determination is not possible. In addition, a starting value problem arises if the vehicle is switched off. The rotor temperature is unknown after restarting. The control unit has no information as to how long the vehicle has been standing and what temperature the rotor has at such point in time.

DE 10 2012 209 057 A1 proposes a method and an apparatus for monitoring the temperature of a permanent magnet electric motor. An alternating voltage is applied to the permanent magnet electric motor of a vehicle and direct voltage outputs of the electric motor are monitored. A temperature of the permanent magnet electric motor is deduced from a measured resistance value of stator windings.

DE 10 2012 221 757 A1 discloses a control apparatus for a synchronous machine. The temperature of the permanent magnets of a synchronous machine is estimated by energizing the synchronous machine and deducing the permanent magnet temperature on the basis of a resulting current flow.

DE 10 2014 216 312 A1 describes a method for sensorless temperature measurement of a direct-current motor. The method is used to evaluate a time constant and a temperature-based resistance and an inductance of a permanent magnet synchronous machine, wherein a temperature of the permanent magnet synchronous machine is calculated.

BRIEF SUMMARY

Against this background, an object of embodiments of the invention is to provide a method and an apparatus for determining a rotor temperature of a permanent magnet synchronous machine (PSM) in an electric vehicle, which eliminate the starting value problem and enable a more precise determination of the rotor temperature.

Embodiments of the invention relate to methods for determining a rotor temperature $T_{Rotor}$ of a permanent magnet synchronous machine (PSM) in an electrically driven vehicle, with which, in a driving state in which no torque is demanded by the PSM, a power electronics system supplying the PSM with energy is operated in a current regulation mode and is regulated such that an alternating current on an AC side of the power electronics system is zero, a direct voltage on a DC side of the power electronics system and an electrical angular velocity $\omega_{el}$ of the PSM are measured and from them the rotor temperature $T_{Rotor}$ is calculated.

According to embodiments of the invention, the rotor temperature is determined in driving states in which no torque is demanded; for example in coasting mode, when the driver lifts off the accelerator pedal.

In one embodiment of the method, an alternating voltage $u_q$ applied to the AC side of the power electronics system is calculated from the measured direct voltage and a known duty cycle of the power electronics system.

In an additional embodiment of the process, the rotor temperature $T_{Rotor}$ is calculated from the alternating voltage $u_q$ applied to the AC side of the power electronics and the electrical angular velocity $\omega_{el}$ of the permanent magnet synchronous machine according to $T_{Rotor} \approx u_q/\omega_{el}$.

If the power electronics system is operated in the current regulation mode and the AC current is regulated to zero, the AC voltage can be determined on the basis of the measured DC voltage and the conversion via the duty cycle of the power electronics system. The induced voltage of the permanent magnets, which gives information about the rotor temperature, can be determined from the AC voltage.

The AC voltage is regulated in the dq coordinate system, which is another representation of the three-phase UVW system. The two systems can be transformed into each other without changing the content.

The generally valid formulas for the AC voltage in the fixed-rotor dq coordinate system are as follows:

$$u_q = R_s * i_q + L_q \frac{di_q}{dt} + \omega_{el} L_d i_d + \omega_{el} \psi_{PM} \quad (1)$$

$$u_d = R_s i_d + L_d \frac{di_d}{dt} - \omega_{el} L_q i_q \quad (2)$$

where:

| | | |
|---|---|---|
| $u_q, u_d$ | dq voltage | [V] |
| $i_q, i_d$ | dq current | [A] |
| $L_q, L_d$ | Inductance on d- and q-axis | [H] |
| $\omega_{el}$ | Electrical angular speed | [Hz] |
| $R_s$ | Stator resistance | [Ω] |
| $\Psi_{PM}$ | Flux linkage of permanent magnets | [Vs] |

The flux linkage of the permanent magnets $\psi_{PM}$ is directly proportional to their temperature $T_{PM}$. The temperature $T_{PM}$ [K] of the permanent magnets corresponds to the rotor temperature $T_{Rotor}$ [K].

Equation (1) is relevant for the determination of the rotor temperature. If $i_q$ and is are regulated to zero, the formula simplifies:

$$u_q = R_s * i_q + L_q \frac{di_q}{dt} + \omega_{el} L_d i_d + \omega_{el} \psi_{PM} \quad (3)$$

$$=> u_q = \omega_{el} \psi_{PM}$$

The rotor temperature $T_{Rotor}$ is determined through the relationship $$u_q \sim \psi_{PM} \text{ und } \psi_{PM} \sim T_{PM} \text{ und } T_{PM} = T_{Rotor} \quad (4)$$

$$T_{Rotor} \approx u_q/\omega_{el} \quad (5)$$

As described above, $u_q$ can be determined using a DC voltage sensor; $\omega_{el}$ is determined using a rotational speed sensor.

Embodiments of the invention also relate to apparatuses for determining the rotor temperature of a permanent magnet synchronous machine (PSM). In one embodiment, an apparatus according to the invention comprises:

a power electronics unit that supplies alternating current to the PSM;

at least one current sensor arranged on the AC side of the power electronics system, which is configured to measure an alternating current in at least one phase supplying the PSM;

at least one voltage sensor arranged on the DC side of the power electronics system, which is configured to measure a direct voltage applied to the DC side of the power electronics;

at least one rotational speed sensor, which is configured to measure a rotational speed of the PSM; and at least one device for controlling the power electronics system and for receiving and processing the measured data of the sensors and for calculating the rotor temperature of the PSM.

The rotor temperature can be calculated from the measured values of the sensors, as described above.

In one embodiment of the apparatus, the at least one device for controlling the power electronics system and for receiving and processing the measured data of the sensors and for calculating the rotor temperature $T_{Rotor}$ of the PSM is configured to regulate an alternating current on the AC side of the power electronics system to zero.

In an additional embodiment of the apparatus, the at least one device for controlling the power electronics system and for receiving and processing the measured data from the sensors and for calculating the rotor temperature $T_{Rotor}$ of the PSM is configured to determine an alternating voltage $u_q$ applied to the AC side of the power electronics system from the direct voltage measured by the at least one voltage sensor arranged on the DC side of the power electronics system.

In an additional embodiment of the apparatus, the at least one device for controlling the power electronics system and for receiving and processing the measured data from the sensors and for calculating the rotor temperature $T_{Rotor}$ of the PSM is configured to determine an electrical angular velocity $\omega_{el}$ of the PSM from the rotational speed of the PSM measured by the at least one rotational speed sensor.

In an additional embodiment of the apparatus, the at least one device for controlling the power electronics system and for receiving and processing the measured data from the sensors and for calculating the rotor temperature $T_{Rotor}$ of the PSM is configured to determine the rotor temperature $T_{Rotor}$ of the PSM from the alternating voltage $u_q$ applied to the AC side of the power electronics system and the electrical angular velocity $\omega_{el}$ of the PSM.

The methods and the apparatuses described herein eliminate the starting value problem in determining the rotor temperature and enable a more accurate calculation of the rotor temperature in order to support a rotor temperature model. In addition they help to ensure the component protection of the PSM. Additional advantages and embodiments of the invention result from the description and the accompanying drawings.

It goes without saying that the features mentioned above and the features yet to be explained below can be used not only in the combination specified in each case but also in other combinations or alone, without departing from the scope of the present invention.

DETAILED DESCRIPTION

Figure 1:
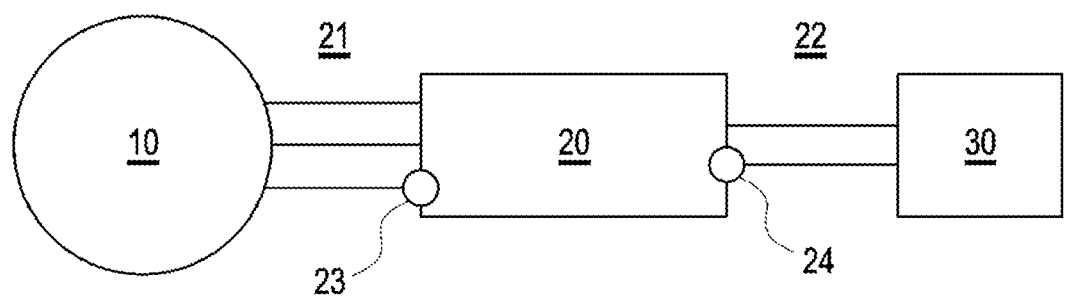
FIG. 1 illustrates a drive train of an electric vehicle configured to carry out methods according to embodiments of the invention.

FIG. 1 schematically shows a drive train of an electric vehicle configured to carry out methods according to embodiments of the invention. The drive train comprises a permanent magnet synchronous machine (PSM) 10, a power electronics system 20 supplying the PSM 10 with electrical energy and a high-voltage (HV) battery 30. An AC side 21 of the power electronics system 20 has three phases connected to the PSM 10. A DC side 22 of the power electronics system 20 is connected to the HV battery 30.

The power electronics system 20 comprises a current sensor 23 in one of the three phases to the PSM 10 on the AC side 21 and a voltage sensor 24 on the DC side 22. The measured values of these two sensors of the power electronics can be used in determining the rotor temperature.

If the power electronics system 20 is operated in a current regulation mode and is regulated such that the alternating voltage on the AC side 21 is zero, the alternating voltage on the AC side 21 can be determined from the DC voltage measured by the voltage sensor 24 through conversion via the duty cycle of the power electronics system 20. This alternating voltage can be used to draw conclusions about the induced voltage of the permanent magnets.

Figure 2:
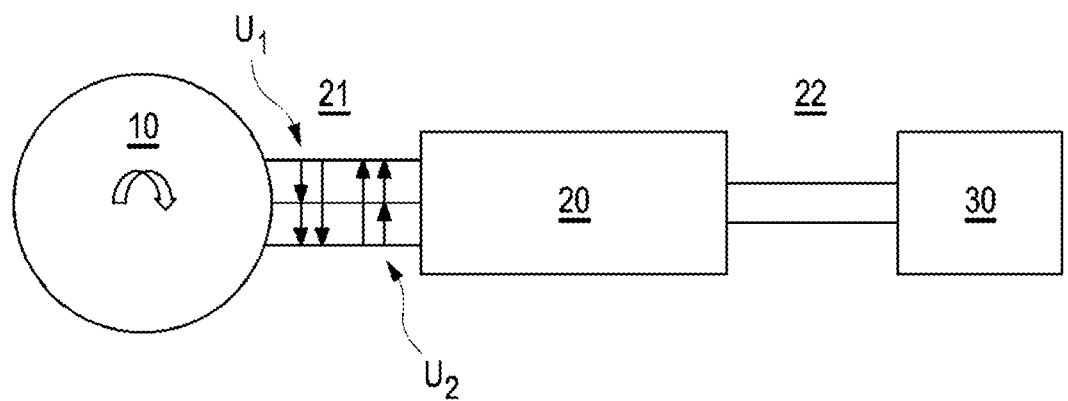
FIG. 2 illustrates a schematic representation of stresses occurring in the drive train of FIG. 1 when carrying out methods according to embodiments of the invention.

FIG. 2 schematically shows the alternating voltages occurring in the drive train of FIG. 1 on the AC side 21 when carrying out a method as described herein. The permanent magnets of the PSM 10 through their movement induce a voltage $U_1$ on the AC side 21 of the power electronics system 20. In order to prevent a current flow, the power electronics system 20 generates a counter-voltage $U_2$ of equal magnitude. The magnitudes of the alternating voltages $U_1$ and $U_2$ correspond to the alternating voltage $u_q$.

The rotor temperature $T_{Rotor}$ of the PSM 10 can be calculated from the alternating voltage $u_q$ and the electrical angular velocity $\omega_{el}$ of the PSM 10 determined via a rotational speed sensor (not shown), according to $T_{Rotor} \approx u_q/\omega_{el}$.

German patent application no. DE 10 2019 126 268.2, filed Sep. 30, 2019, to which this application claims priority, is hereby incorporated herein by reference, in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for determining a rotor temperature of a permanent magnet synchronous machine in an electrically driven vehicle, comprising:

in a driving state in which no torque is demanded of the permanent magnet synchronous machine, operating a power electronics system supplying the permanent magnet synchronous machine with energy in a current regulation mode;

regulating the power electronics system such that an alternating current on an AC side of the power electronics system is zero;

while the alternating current on the AC side of the power electronics system is zero, measuring a direct voltage on a DC side of the power electronics system and an electrical angular velocity of the permanent magnet synchronous machine;

calculating an alternating voltage applied to the AC side of the power electronics unit from the measured direct voltage and a duty cycle of the power electronics unit; and calculating the rotor temperature based on the measured direct voltage and the measured electrical angular velocity, wherein the rotor temperature is calculated from the calculated alternating voltage applied to the AC side of the power electronics unit and the measured electrical angular velocity of the permanent magnet synchronous machine according to rotor temperature-≈alternating voltage divided by the measured electrical angular velocity.

2. The method according to claim 1, wherein the driving state, in which no torque is demanded of the permanent magnet synchronous machine, is a coasting mode.

3. An apparatus for determining a rotor temperature of a permanent magnet synchronous machine, comprising:

a power electronics unit that feeds the permanent magnet synchronous machine with alternating current;

at least one current sensor arranged on an AC side of the power electronics unit, which is configured to measure an alternating current in at least one phase supplying the permanent magnet synchronous machine;

at least one voltage sensor arranged on a DC side of the power electronics unit, which is configured to measure a direct voltage applied to the DC side of the power electronics unit;

at least one rotational speed sensor, which is configured to measure a rotational speed of the permanent magnet synchronous machine; and at least one device for controlling the power electronics unit and for receiving and processing the measured direct voltage and the measured rotational speed from the sensors, for calculating an alternating voltage applied to the AC side of the power electronics unit from the measured direct voltage and a duty cycle of the power electronics unit and for calculating the rotor temperature of the permanent magnet synchronous machine based on the measured direct voltage and the measured rotational speed, wherein the rotor temperature is calculated from the calculated alternating voltage applied to the AC side of the power electronics unit and the measured electrical angular velocity of the permanent magnet synchronous machine according to rotor temperature≈alternating voltage divided by the measured electrical angular velocity.

4. The apparatus according to claim 3, wherein the at least one device for controlling the power electronics unit and for receiving and processing the measured data from the sensors and for calculating the rotor temperature of the permanent magnet synchronous machine is configured to regulate an alternating current on the AC side of the power electronics unit to zero.

5. The apparatus according to claim 3, wherein the at least one device for controlling the power electronics unit and for receiving and processing the measured data from the sensors and for calculating the rotor temperature of the permanent magnet synchronous machine is configured to determine an electrical angular velocity of the permanent magnet synchronous machine from the rotational speed of the permanent magnet synchronous machine measured by the at least one rotational speed sensor.

\* \* \* \* \*